(12) United States Patent
Bevan et al.

(10) Patent No.: US 8,125,917 B2
(45) Date of Patent: Feb. 28, 2012

(54) OPTIMISATION OF TRANSMISSION PARAMETERS OF ACCESS POINTS IN WIRELESS NETWORKS

(75) Inventors: David Bevan, Bishops Stortford (GB); Simon Gale, Bishops Stortford (GB); Steven Hall, Harlow (GB); Andrew Jeffries, Safron Walden (GB)

(73) Assignee: Avaya Inc., Basking Ridge, NJ (US)

( * ) Notice: Subject to any disclaimer, the term of this patent is extended or adjusted under 35 U.S.C. 154(b) by 686 days.

(21) Appl. No.: 12/249,077

(22) Filed: Oct. 10, 2008

(65) Prior Publication Data

US 2010/0091745 A1    Apr. 15, 2010

(51) Int. Cl.
*H04L 12/26* (2006.01)
(52) U.S. Cl. .................. 370/252; 370/338; 455/522
(58) Field of Classification Search .................. None
See application file for complete search history.

(56) References Cited

U.S. PATENT DOCUMENTS

| 6,340,948 | B1 * | 1/2002 | Munoz-Garcia et al. ..... 342/373 |
| 7,181,245 | B2 | 2/2007 | Smith |
| 7,184,777 | B2 | 2/2007 | Diener |
| 2006/0099984 | A1 * | 5/2006 | Brusch et al. ................. 455/522 |
| 2008/0102881 | A1 * | 5/2008 | Han et al. ...................... 455/522 |

\* cited by examiner

*Primary Examiner* — Seema S Rao
*Assistant Examiner* — Khoa Huynh
(74) *Attorney, Agent, or Firm* — Maldjian Law Group LLC; John P. Maldjian, Esq.; Alexander D. Walter, Esq.

(57) ABSTRACT

In a wireless network comprising access points deployed within a designated zone of coverage, the radio frequency field strength resulting from radiation from the access points is optimised as a function of location by means of control of the transmission power and/or radiation pattern of the access points in response to measurements from sensors at defined locations that measure received signal power, the received power being related to radio frequency field strength. Sensors may be deployed within the designated zone of coverage, at the edge of the zone and/or outside the zone and optimization of the transmission parameters of the access points in terms of transmission power and/or radiation pattern is carried out taking into account the location of the sensors in addition to the received power at the sensors.

16 Claims, 9 Drawing Sheets

OPTIMISATION OF TRANSMISSION PARAMETERS OF ACCESS POINTS IN WIRELESS NETWORKS

FIELD OF THE INVENTION

The present invention relates generally to data communications networks, and more specifically to a method and apparatus for optimising the coverage of networks including wireless access points.

BACKGROUND OF THE INVENTION

Data communications networks often include elements that are connected by a wireless link. There are many benefits to a wireless connection, in particular providing the mobility of a wirelessly connected device and the convenience and potential cost savings associated with the reduction of wired infrastructure. Typically, a number of static wireless access points may be deployed within a local zone to which mobile devices may form wireless connections, the connections typically conforming to an industry standard such as an IEEE 802.11 standard, for example IEEE 802.11n. Preferably the wireless connection points are arranged in such a way as to give useful coverage in the zone concerned and are connected to a data network by wired or wireless links. However, the wireless bandwidth available is typically subject to limitations due to spectrum allocation imposed by regulatory authorities and so it is desirable to ensure that the wireless resource is used in an efficient manner. This is typically achieved by careful planning of the siting, transmission power and frequency of operation of the wireless connection points.

With the growth of the use of wireless networks, it is becoming increasingly likely that a wireless network may lie adjacent to another network. For example, a network may be next to a network used by a different enterprise occupying an adjacent building, so that it is possible that interference will be experienced between the networks. Furthermore, it is often undesirable that a wireless connection is possible outside a desired zone of coverage due to considerations of network security. It is accordingly desirable to restrict coverage to within a defined zone, typically a building or enterprise. A location may be said to have wireless coverage if a signal may be received at that location with an acceptable quality; there are a number of well known measures of signal quality that may be used to define coverage, among them signal power level, signal-to-noise-and-interference ratio and bit error rate. Typically, a wireless network may operate in an unlicensed band, for example the industrial, scientific and medical unlicensed bands at approximately 2.4 GHz or 5 GHz, in which many other devices such as video senders may operate. What is more, devices such as microwave ovens may emit spurious signals within these bands, potentially interfering with operation of a wireless network operating within the same frequency band.

It is known to use sensors as an aid to planning a wireless network in terms of the siting, transmission power and operating frequency of access points; such sensors may measure the received signal power of transmissions from access points within the network, as well as detecting interfering signals from other networks and other devices. The received signal power is related to radio frequency field strength at the location of the antenna of the sensor, according to the gain of the antenna. A measure of received signal power can thus be used as an indication of the radio frequency field strength. Such sensors are typically hand held devices, and may be used, for example, to search for active access points in a given zone. Sensors may perform a spectrum analysis function to identify frequencies that are occupied by signals and interference, and signal analysis to distinguish signals from interference. Sensors can perform a search for available access points, the search involving passive or active scanning; passive scanning simply involves measurement of received signals and active scanning involves sending a beacon probe, to which available access points may be programmed to respond.

It is known that sensors may be connected to a server and a network management station, as for example as disclosed in U.S. Pat. No. 7,184,777. Such a system may include a performance manager to initiate actions to mitigate the impact of current radio frequency conditions. The performance manager may configure access points to operate on other channels or adjust the transmit power of an access point in response to a high level of interference detected by sensors.

Typically, wireless network planning may be carried out with the aid of a planning tool, such as the Nortel WLAN Management Software 2300 Series. Such tools typically provide a method of entering a map of a zone in which wireless coverage is required into a model, and an operator may add details of known radio frequency obstructions to the map. The tool may predict radio frequency coverage within the zone, and the operating powers and frequencies may be adjustable within the model to give a required coverage zone. However, the accuracy of the model is limited by the data input by an operator; propagation conditions may be complex and not all radio frequency obstructions and reflections may be recognised. Furthermore, the flexibility in siting access points may be limited by practical constraints, and adjustment of the transmit power and operating frequency of access points gives a limited scope for optimizing coverage.

It is an object of the present invention to provide a method and apparatus which addresses these disadvantages.

SUMMARY OF THE INVENTION

In accordance with a first aspect of the present invention, there is provided a method according to claim 1. A benefit of locating at least one sensor at the edge of a designated zone of coverage is that the coverage may be optimised by limiting coverage to within the designated zone. An advantage of locating at least one sensor outside of a designated zone of coverage is that the coverage may be optimised by minimising the coverage outside the designated zone. Controlling the transmitted power from the access point in dependence on a difference between the measured power at each of a plurality of sensors and an expected level of power at each of the a plurality of sensors and in dependence on the location of each sensor has the benefit that the control may be implemented according to a pre-defined algorithm determining trade-offs between the potentially conflicting requirements at each sensor so that the correspondence between the resulting wireless coverage and the designated zone of coverage is optimised.

Preferably, a radiation pattern from the wireless access point is controlled in dependence on the measurement of power at each sensor and the location of each sensor in relation to a designated zone of coverage. A benefit of controlling the radiation pattern is that the transmitted power of the access point may be controlled as a function of direction so that coverage may be maximised within a desired zone of coverage and minimised outside the desired zone of coverage more effectively than may be achieved by an access point with a fixed radiation pattern.

Advantageously, the signal to interference ratio of the received signal at each sensor is measured and the control of the radiation power of the access point is dependent on the measurement. A benefit of this is that coverage may be optimised in terms of signal to interference ratio, providing a more accurate predictor of coverage if interference is experienced than may be obtained by a measure of signal power alone.

Conveniently, the network comprises a plurality of access points and control of the transmitted power of the access points is dependent on the power of the best server received at each sensor. The best server is the access point that provides the best signal in terms of signal strength at a sensor. A benefit of measuring the signal strength of the best server is that an objective function will be representative of the coverage obtained in a network of a plurality of access points.

Advantageously, the total power is measured of signals received at each sensor. This is an approximation to the signal power of the best server, and has the benefit of enabling an economical sensor implementation.

Preferably, the transmitted power of each access point is dependent on the traffic loading of the access point. This has a benefit that, in a network of a plurality of access points, the coverage zone of a heavily loaded access point may be reduced and that of a lightly loaded access point may be increased, thereby balancing loading in the network and potentially easing network congestion. This balancing may be achieved by minimisation of an objective function, where a contribution to the objective function is based on traffic loading.

DETAILED DESCRIPTION OF THE INVENTION

In general, the present invention is directed to methods and apparatus for for optimising the coverage of networks including wireless access points.

By way of example an embodiment of the invention will now be described in the context of a zone such as business premises, which is provided with a network of wireless access points, which may also be referred to as connection points or base stations, with which one or more user equipments can form wireless connections. The access points will typically include transceivers appropriate for a wireless connection and also a wired connection to a further portion of a data network, which may be a corporate network including a data centre in another location or it may include a connection to the internet. Various types of devices equipped with a wireless transceiver can be connected to the network via the connection points, such as personal computers (PCs) and mobile data units such as PDAs (personal digital assistant), which can be moved within the wireless coverage zone of an access point and also between access points within the business premises.

The present invention may be applied to data networks used to communicate any type of data including but not limited to digitally encoded voice signals, audio signals generally, images and video streams. The wireless signals may conform to industry standards such as IEEE 802.11 WiFi, but could also conform to other industry standards such as ultra-wideband radio, or to a proprietary standard, or could conform to no particular accepted standard.

Figure 1:
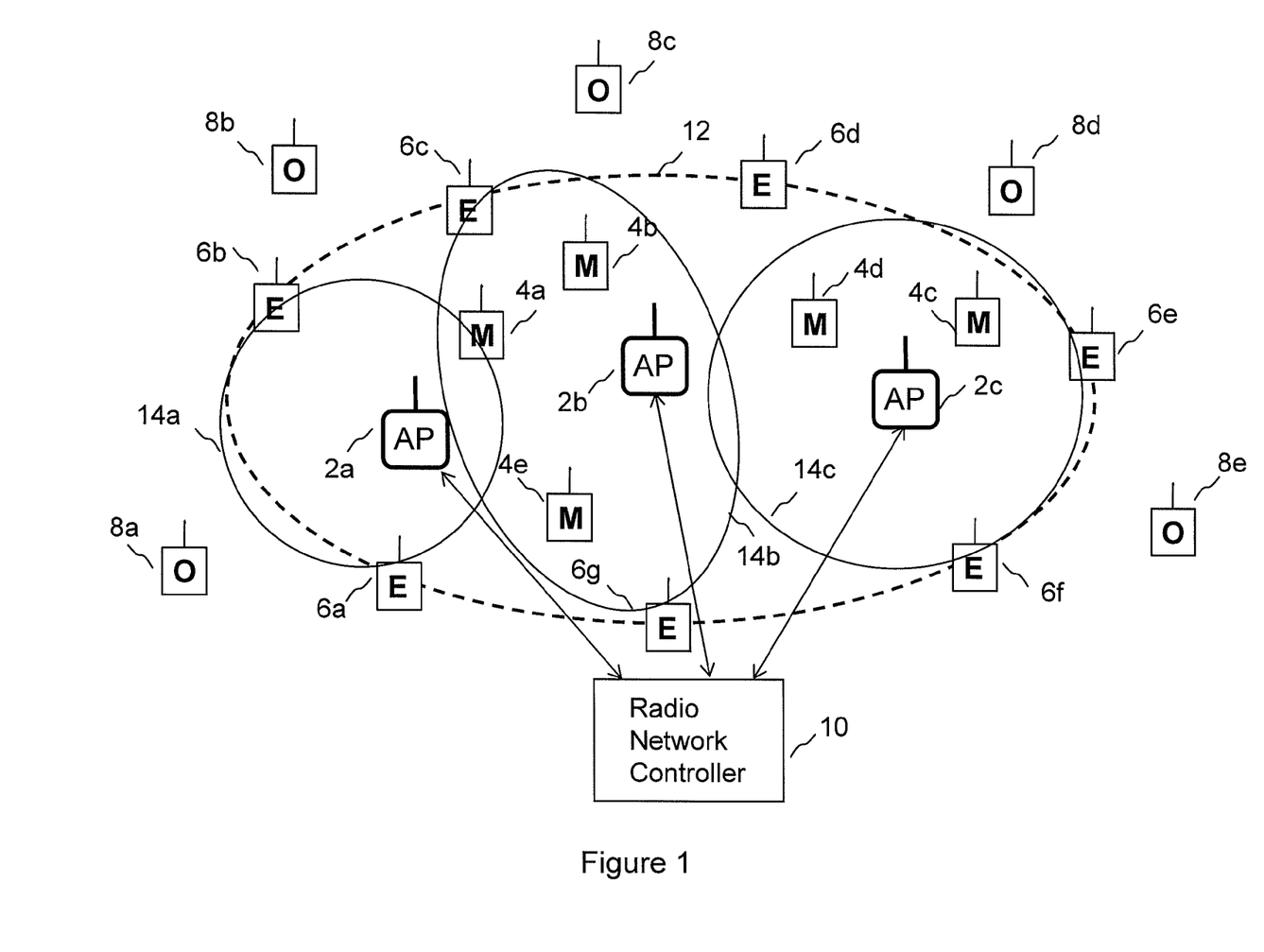
FIG. 1 is a schematic diagram showing a wireless communication network according to an embodiment of the invention.

FIG. 1 shows a network according to an embodiment of the invention comprising three access points 2a, 2b and 2c located within a designated zone of coverage 12, and sensors deployed at three types of location; sensors deployed within the desired zone of coverage designated as middle, or "M" sensors 4a . . . 4e, those situated at the edge of the desired zone of coverage designated as edge or "E" sensors 6a . . . 6g, and those situated outside the desired zone of coverage designated as outside or "O" sensors 8a . . . 8e. The desired zone of coverage is a zone, typically designated by a network planner or administrator, in which it is intended that a radio frequency link may be established between a user equipment and an access point or one of a plurality of access points. In a building, the zone may be conveniently defined in terms of an area of floor space over which users are intended to be able to receive a radio frequency (RF) signal of acceptable quality, the quality being typically defined by signal level. The area of coverage is therefore assumed to represent a volume or zone extending above the floor space, in which user equipments may reasonably be expected to be sited, the height of which will depend on the application; for example, in a warehouse there may be a desired zone of coverage extending to a greater height than in an office space. So it can be appreciated that, although the designated coverage is conveniently described as an area, the invention is not limited to optimisation of coverage of a two dimensional area; coverage may also be optimised in the vertical dimension and within three dimensional space. Sensors may be deployed, for example, on floors and ceilings in addition to being deployed on the walls of a building.

Each sensor is in communication with a radio network controller, that may be situated local to the access points or at a location remote therefrom; the communication may be by means of the radio resource used by the access points, or by a different radio resource, possibly operating to a different standard from that used for communication between the access points and user equipment. For example, the access points may be operating in a 5 GHz WiFi band and the communication between the sensors and the radio network controller may involve use of the 2.4 GHz WiFi band, or vice versa.

Alternatively or in addition, sensors may communicate with the radio network controller using a radio protocol optimised for low data rate communications such as Zigbee or other protocol applicable to sensor networks. Sensors may be small cheap low power devices and they may scavenge power from the environment so that there is no need for battery or mains electricity power to be provided to the sensors. Sensors may communicate by modulation of a reflected radio frequency signal as is well known in the field of radio frequency ID tags, thereby enabling low power operation.

Alternatively, sensors may be powered by a source of mains electricity, and as such may be conveniently located within an enclosure which may be plugged into a mains power socket. The communication between the sensor and the radio network controller may conveniently be in part by power line communication techniques, by which signals may be sent from the sensor to a convenient location for connection to a data link to the radio network controller.

Generally the sensors located outside the zone of coverage are arranged to use other means of communication than the radio resource used by the access points. However, in some cases, sensors located outside the desired zone of coverage may be able to use the radio resource used by the access points if the communication is at a low data rate enabling a link to be established with weaker signal to noise ratio than would be acceptable for communication to user equipment in communication with the access point.

As illustrated in FIG. 1, the radio network controller 10 is in communication with the wireless access points 2a, 2b, 2c, via a data link, typically a conventional wired telecommunications connection that may have a component involving a radio or other link. The radio network controller 10 controls the radiated power and preferably also the radiation pattern from each wireless access point, dependent on measurements at each sensor and the position of each sensor in relation to a desired zone of coverage. The radiation pattern and/or transmission power of each access point is controlled such that the composite of the zones of coverage 14a, 14b, 14c of the wireless access points corresponds as closely as possible to the desired zone of coverage 12. In the example of FIG. 1, access point 2c is shown with an omni directional radiation pattern; the coverage zone 14c is controlled by the transmit power of the access point 2c. Access points 2a and 2b are shown with a zone of coverage that is determined by control of the radiated power and/or by control of the radiation pattern of the respective access points.

Control of the radiation power and/or radiation patterns of the access points 2a, 2b, 2c may be by means of the minimisation of a cost function, also referred to as an objective function. The objective function is based on a combination of contributions from sensors, the objective function being designed so that its minimisation will result in a situation closer to a desired solution; this may be a field strength pattern that will give an area of wireless coverage that is optimised to be as close as possible to a desired or designated zone of coverage. As has already been mentioned, a location may be said to have wireless coverage if a signal may be received at that location with an acceptable quality, which may be defined for example by signal power level, signal-to-noise-and-interference ratio or bit error rate. Each of these measures is related to the radio frequency field strength at the location in question. The goal of the minimisation of the objective function may be viewed as the optimisation of the pattern of radio frequency field strength. The radio network controller 10 therefore controls the radiation pattern and/or transmission power of each access point in such a way as to minimise the objective function.

It should be noted that an embodiment of the invention may simply comprise a single access point. In this case an objective function is pre-defined such that minimisation of the objective function, typically under the control of the radio network controller, results in optimisation of the field strength resulting from radiation of power that is transmitted from the access point.

Figure 2:
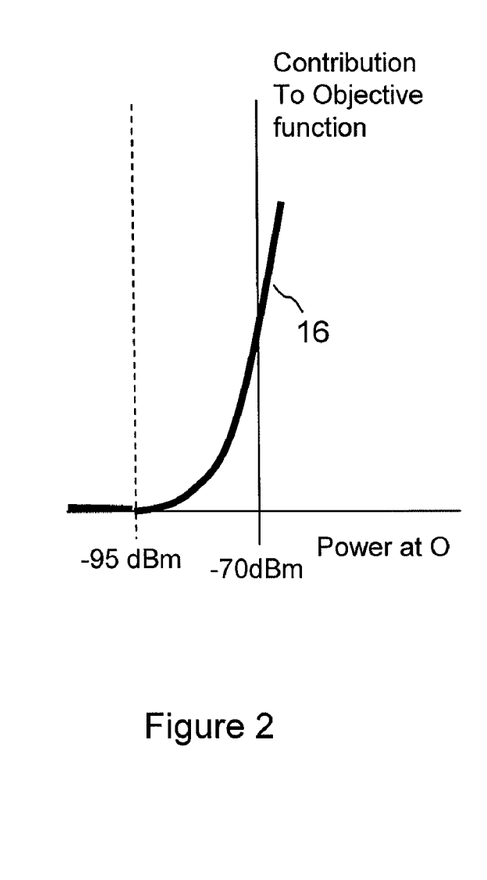
FIG. 2 shows a typical contribution to an objective function for a sensor located outside a designated zone of coverage as a function of received power.
Figure 3:
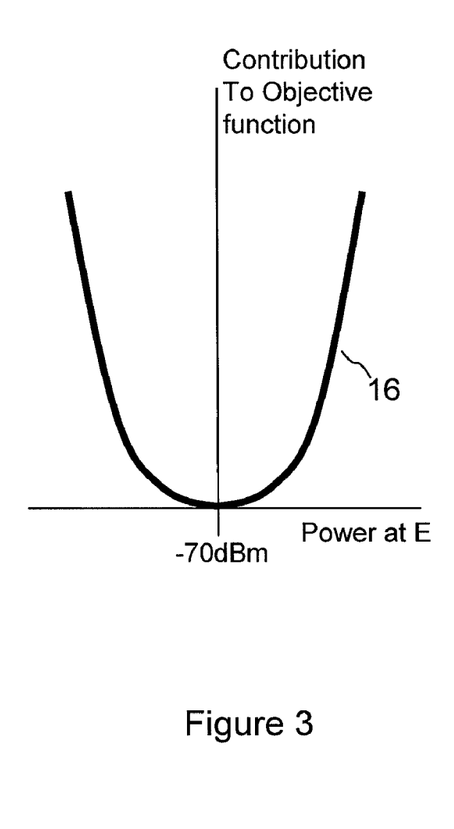
FIG. 3 shows a typical contribution to an objective function for a sensor located at the edge of a designated zone of coverage as a function of received power.
Figure 4:
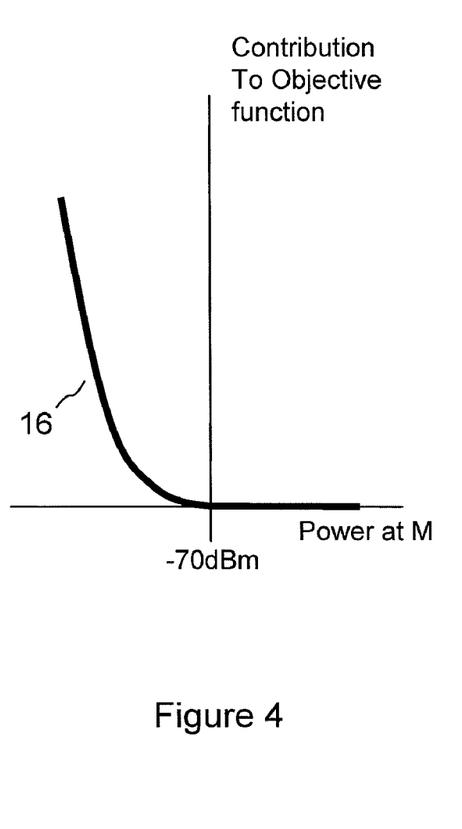
FIG. 4 shows a typical contribution to an objective function for a sensor located within a designated zone of coverage as a function of received power.

FIGS. 2, 3 and 4 show typical functions that relate the power measurement of a signal received by a sensor to a contribution 16 from that sensor to an objective function. The figures show, respectively, the relationships between power received by a sensor and the contribution from the sensor, for a sensor located outside the desired zone of coverage of the network (FIG. 2), at the edge of the zone (FIG. 3), and within the zone (FIG. 4). In this case, the objective function is a function that is designed to vary as a function of correspondence between the coverage of the network and a desired pattern of coverage. For example, the objective function may decrease as the coverage within a desired zone increases, but may increase if an increased amount of power is detected outside the desired zone of coverage.

As can be seen from FIG. 2, the contribution 16 to the objective function from a sensor located outside the desired zone of coverage may be constant below a maximum acceptable value of received power, and increase for received powers above this value. The acceptable value of received power, also referred to as a threshold, is shown here as −95 dBm within the operating channel of a wireless link (typically 20 MHz); the threshold is set at a level at which a connection is unlikely to be possible. The threshold value can be set to other levels according to the requirements of a particular system; for example, it may be convenient to set the threshold value to the noise floor in a particular system. The curve defining the contribution 16 to an objective function for received powers above the threshold may be set to a convenient shape according to the perceived penalty or benefit associated with the reception of a signal at a given power level. For example, a convenient form of the curve may be the square of the logarithm of the ratio of the received power to the threshold power; that is to say, the square of a decibel value. Alternatively, a linear, log or polynomial relationship between the received power level and the contribution to the objective function may be found to be beneficial, or a combination of these relationships. Similar considerations apply to the contributions to the objective function as illustrated in FIGS. 3 and 4.

As illustrated in FIG. 3, for a sensor situated at the edge of a designated zone of coverage, the contribution 16 to the objective function may increase as the received power deviates, either above or below a value corresponding to a minimum acceptable signal level. In the case illustrated, a power level of −70 dBm is shown as a minimum acceptable signal level, again assumed measured in a 20 MHz bandwidth; the acceptable level is system-specific and will depend on the modulation format and intended data rate. In addition, the acceptable level may depend on the interference environment, so that if interference is expected, a higher acceptable signal level may be set than if the environment is interference free.

As illustrated in FIG. 4, for a sensor situated within a designated zone of coverage, the contribution 16 to the objective function may increase as the received power deviates below a value corresponding to a minimum acceptable signal level. As in the case of FIG. 3, a power level of −70 dBm is shown as a minimum acceptable signal level. If the received signal power is above the acceptable level, the contribution to the objective function is constant; this illustrates that there is no perceived benefit in a signal power above the acceptable level, compared to a signal received at the acceptable level. Typically the constant value may be zero, but other values may be desired according to the form of the objective function; in some cases, there may be a value in a non-constant value; for example the contribution to the objective function may rise again above a designated maximum desirable received power level, in order to minimise power consumption in the network, for example, since power consumption may be related to transmitted power from the access point or points.

In each of the cases illustrated in FIGS. 2, 3 and 4, the signal power is preferably the power of the best server as seen by the sensor, that is to say the access point that provides the best signal in terms of signal level or signal to interference ratio. The selection of an access point as best server may change as the controller optimises the coverage pattern. It can thus be appreciated that the adaptation process by which the objective function is minimised proceeds as an iterative process, that may experience discontinuities due to, for example, selection of a different best server to produce the output of a sensor.

In a variant, as an approximation to the selection of best server, the total power of servers received at a sensor may be used to calculate the contribution to the objective function. This approximation may be beneficial in simplifying the design of sensors and therefore potentially minimising the cost and power consumption of the sensors.

It is possible to control the transmit powers and/or radiation patterns of the access points using a variety of algorithms by which the objective function may be minimised. It should be noted that minimisation of an objective function or cost function is equivalent to maximising a function representing a figure of merit for the coverage. One well-known method of minimising an objective function is the Nelder-Mead Downhill Simplex algorithm. Such an algorithm operates by perturbing controllable variables, such as a transmission power, the attenuation of an antenna beam or a complex weight applied to an antenna element, and measuring the effect of the perturbation on the objective function. The controllable variables are then updated to minimise the objective function. Other algorithms are well known for minimising an objective function, such as a simple sequential perturbation algorithm, in which each variable in turn is individually perturbed and an update is made in the direction that minimised the objective function.

Figure 5:
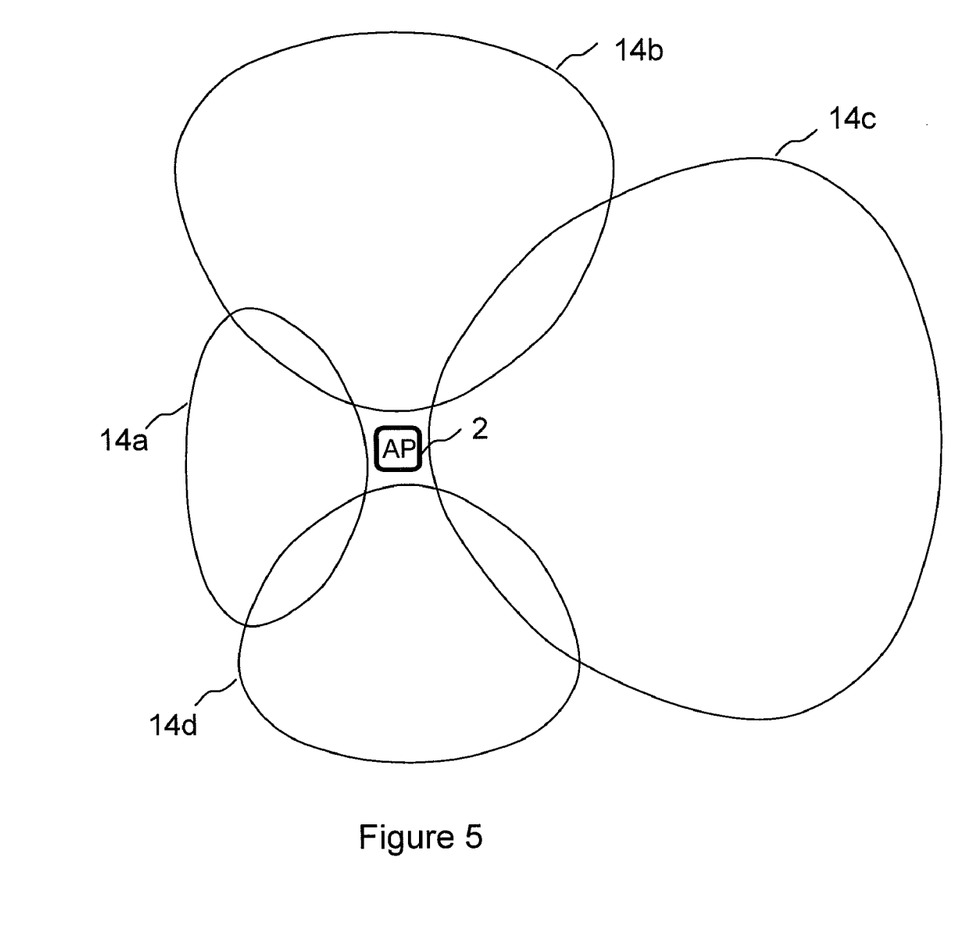
FIG. 5 shows zones of coverage of an access point employing a controlled antenna pattern.

FIG. 5 illustrates the control of the radiation pattern of an access point 2 by the control of the gain applied to a plurality of antenna beams. The zones of coverage 14*a*, 14*b*, 14*c*, 14*d* of respective beams are varied by control of the gain of the respective beams. The example of four beams is shown, but it will be appreciated that any number of beams may be employed, including beams that vary in elevation as well as azimuth, thereby forming a three dimensional radiation pattern.

In the regions of overlap between the zones of coverage of the beams, for example the zone of overlap between zones of coverage 14*a* and 14*b*, interference between the respective beams may cause nulls in the radiation pattern, which are undesirable in terms of maximising coverage. To avoid the formation of nulls, it is disclosed in the applicant's U.S. Pat. No. 7,181,245 to arrange that beams that are spatially adjacent are operated on orthogonal polarisations, thereby avoiding interference between adjacent beams.

Figure 6:
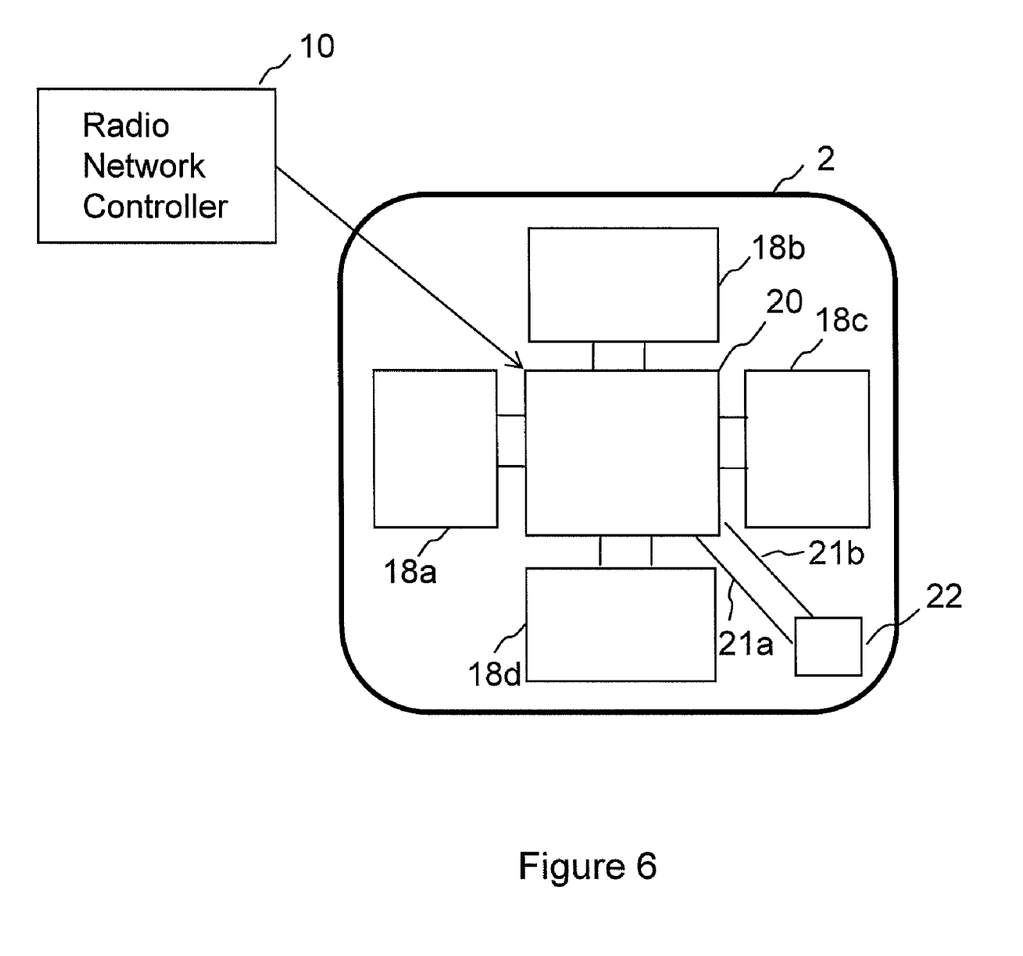
FIG. 6 shows an access point according to an aspect of the invention.

FIG. 6 shows in schematic form an access point 2 that may implement the beam patterns of FIG. 5. A radio network controller 10 is in control of an antenna feed network 20 that feeds signals to and from a radio transceiver 22 to beam antennas 18*a*, 18*b*, 18*c*, 18*d*. The beam antennas may be arranged with elements that transceive with orthogonal polarisations. There may be two or more radio channels, e.g. diversity branches, connected from the transceiver 22 via respective connections 21*a*, 21*b* to the feed network 20; the channels may be used to operate on diverse antenna patterns, for example polarisation diverse patterns.

Figure 7:
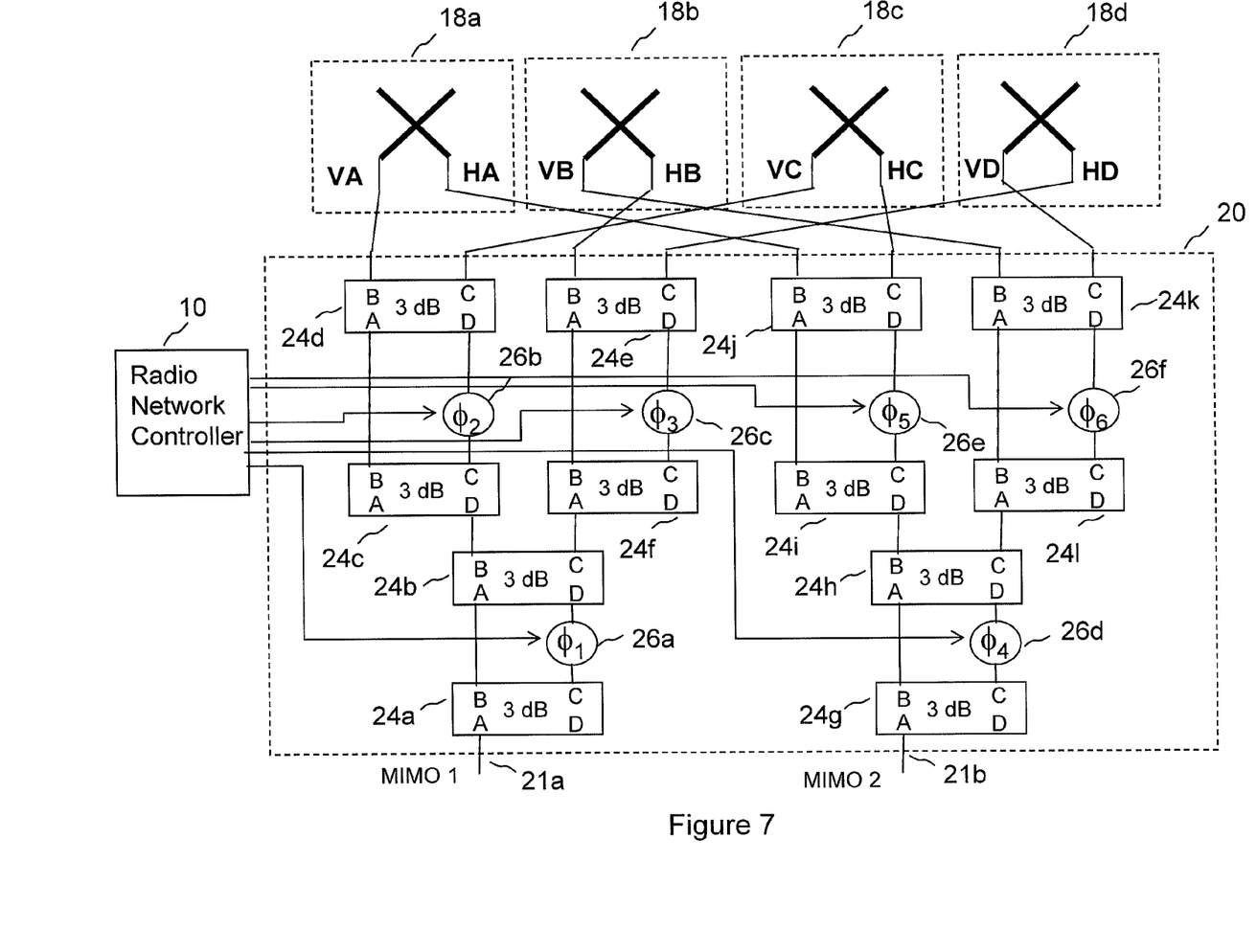
FIG. 7 shows a feed network and beam antennas according to an aspect of the invention.

FIG. 7 shows in more detail the feed network 20 and beam antennas 17*a*, 18*b*, 18*c* and 18*d* of FIG. 6. The feed network operates on the well-known principle that an unequal power split may be achieved losslessly by a network of back-to-back 3 dB hybrids with phase shifters placed between them on one arm; adjustment of the phase shifter determines the power split, avoiding the inefficiency of using attenuators.

The principle of operation may be illustrated by considering 3 dB hybrids 24*a* and 24*b*. Adjustment of phase shifter 26*a* determines the split of power applied to port A of 3 dB hybrid 24*a*, between ports B and C of 3 dB hybrid 24*b*. A succession of similar variable splitter structures is arranged so that an input applied to the feed network 20 at 21*a* will be split between antenna elements VA, HB, VC and HD of beam antennas 18*a*, 18*b*, 18*c* and 18*d* respectively, where V signifies vertical polarisation and H signifies horizontal polarisation. It will be appreciated that the designations of polarisation are arbitrary and other orthogonal pairs of states of polarisation could be used such as ±45 degree linear polarisation or left hand and right hand circular polarisation. The power split will be determined by the settings of phase shifters 26*a*, 26*b* and 26*d* as controlled by the radio network controller 10.

Similarly, an input applied to the feed network 20 at 21*b* will be split between antenna elements HA, VB, HC and VD of beam antennas 18*a*, 18*b*, 18*c* and 18*d* respectively. The power split will similarly be determined by the settings of phase shifters 26*d*, 26*e* and 26*f* as controlled by the radio network controller 10

For multiple in, multiple out (MIMO) applications, such as may be employed when using the standard IEEE802.11n, two MIMO branches MIMO1 and MIMO 2 may comprise respective ports 21*a* and 21*b* of the feed network 20. Accordingly, embodiments of the invention are particularly suited for use with such MIMO applications.

Alternative arrangements may be implemented in which the 3 dB hybrids 24*d*, 24*e*, 24*j* and 24*k* are connected to different respective antenna elements of beam antennas 18*a*, 18*b*, 18*c* and 18*d* from those shown in FIG. 7. In principle, any permutation in which a given MIMO input 21*a* or 21*b* is connected to four antenna elements may be implemented. Generally it is preferable that each MIMO input 21*a* or 21*b* should be connected to antenna elements whose coverage area does not coincide in order to give best control of coverage. Also, it is preferable that adjacent beams for a given MIMO input 21*a* or 21*b* are orthogonally polarised, to avoid interference in any region of overlap between beams.

It will be apparent to one skilled in the art that the feed network of FIG. 7 may be extended to feed any number of antenna elements, by the use of an appropriate number of cascaded power splitters, the power splitters being, for example, formed, as has already been mentioned, by back to back 3 dB hybrids and a phase shifter as illustrated in FIG. 7 by elements 24*a*, 24*b* and 26*a*.

Figure 8:
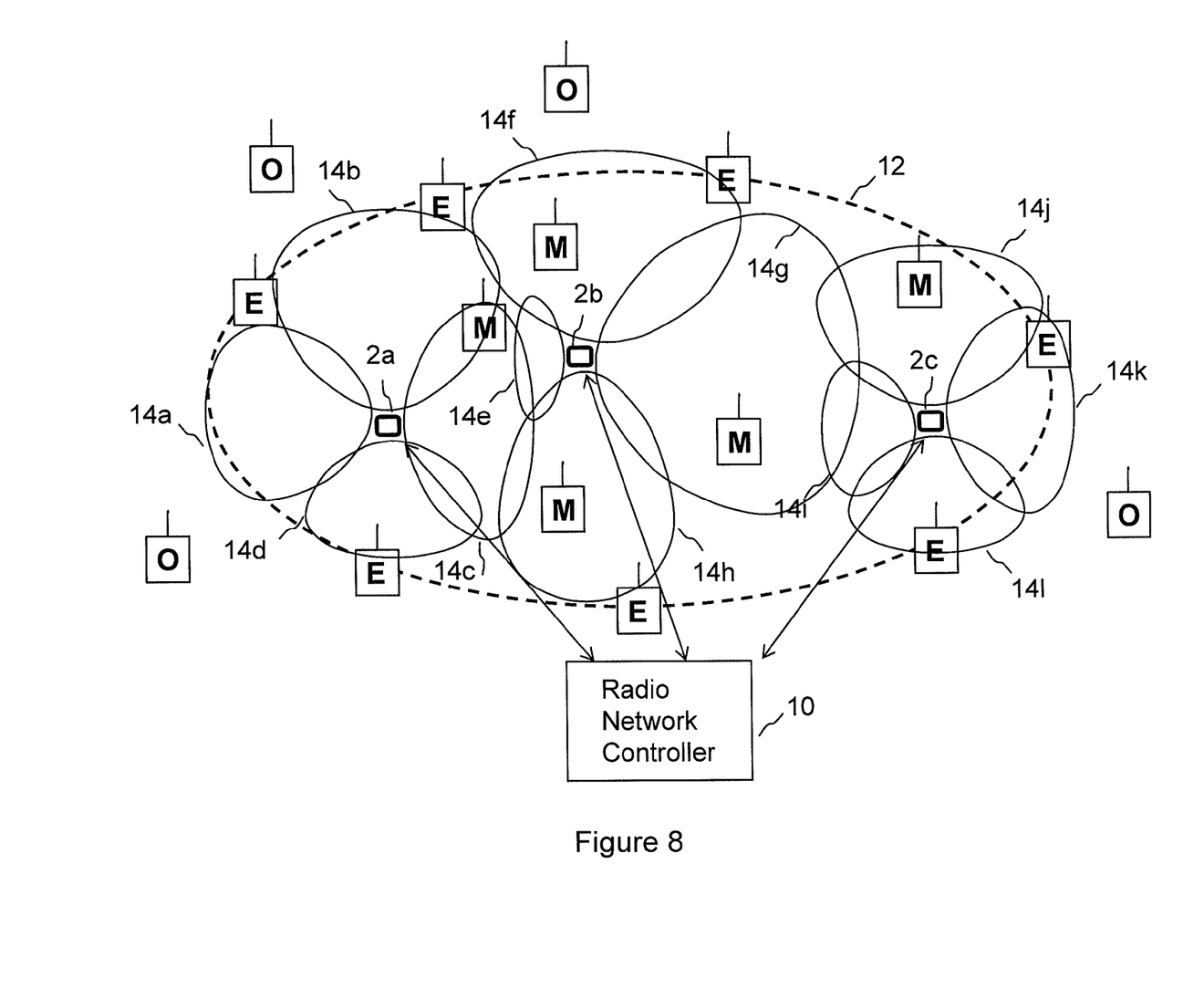
FIG. 8 shows zones of coverage of a antenna beams within a network according to an aspect of the invention.

FIG. 8 illustrates the effect of the control of beam gains of access points 2*a*, 2*b*, 2*c*, where the access points are configured as illustrated by FIG. 6. The zones of coverage 14*a* . . . 14*l* of respective beam patterns are adjusted under control of the radio network controller 10 to optimise the coverage within the designated desired zone of coverage 12 as described above.

Figure 9:
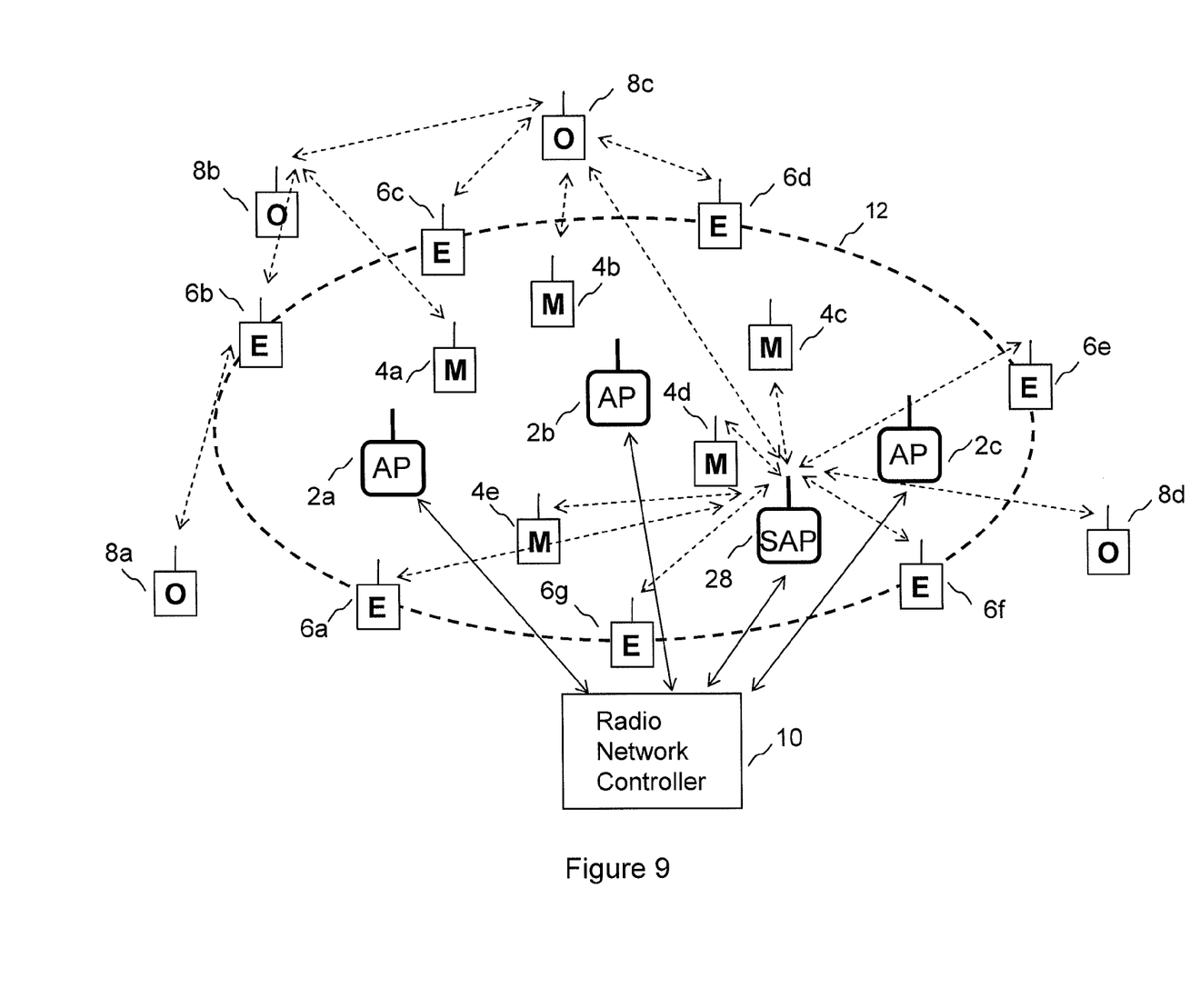
FIG. 9 shows a multi-hop network of sensors in a network according to an aspect of the invention.

FIG. 9 illustrates a method of communicating between the sensors of a network such as that illustrated by FIG. 1 and a radio network controller 10. A sensor access point 28 is provided for communication with sensors 4a ... 4e, 6a ... 6g and 8a ... 8d. As mentioned already, communication may be in a band not used by the wireless access points for communication with user equipment.

It can be seen that FIG. 9 illustrates sensors connected in a multi-hop network, each sensor being arranged to pass a message from one sensor to another; for example, outside sensor 8a is connected via a radio communication link, referred to as a "hop", to edge sensor 6b and then via outside sensors 8b and 8c to the sensor access point 28. The sensor access point 28 may, as already mentioned, operate in a different frequency band from payload access points 2a, 2b 2c. By this means, communication may be maintained with sensors over a wide zone by the deployment of a single sensor access point. This is economical in terms of hardware deployed, and the relatively low data rate of the sensor data is well suited to transmission in this multi-hop fashion, that may re-use frequencies in a time shared manner that results in a relatively low data capacity but economical use of radio spectrum.

Thus, a network of sensors is envisaged, in which the sensors are deployed around the periphery of a designated desired zone of coverage, and are preferably also deployed inside and outside the zone. Preferably, the sensors are small, cheap and ideally low powered battery operated or self-powered by power scavenging from the environment. There may be a large number of sensors deployed, communicating in a multi-hop manner at low transmit power due to the short distances between the sensors. The sensors may for example be distributed across the walls, ceilings and floors of a zone within a building, so that coverage can be restricted within that zone, by control of transmission powers and/or antenna patterns of access points within the zone in response to measurements at the sensors. This enables interference-free co-existence between the networks of neighbouring enterprises and enhances network security. In addition, minimisation of transmission power while maintaining adequate coverage allows power consumption of a wireless network to be minimised with consequent benefits in terms of reduced operating costs and lower carbon footprint.

Figure 10:
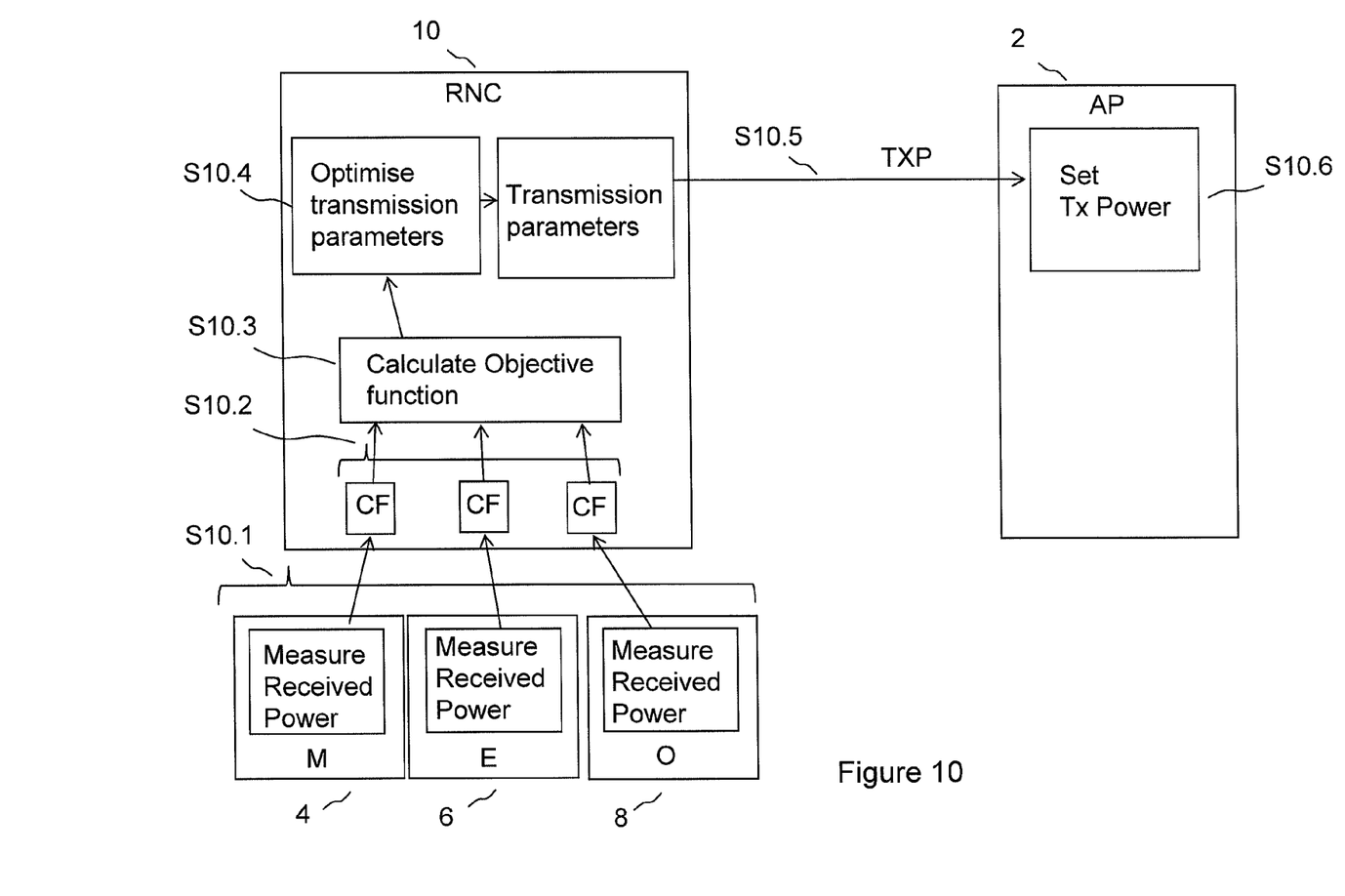
FIG. 10 is a diagram showing a typical logical flow of messages in a system with one access point implemented as an embodiment of the invention.

FIG. 10 shows typical signalling in an embodiment of the invention, in which the transmission power of an access point 2 is controlled by a radio network controller 10 in dependence on outputs from sensors 4,6,8. Typical operation involves the following steps, which will typically be carried out iteratively; that is to say, transmission parameters may be gradually changed by a number of cycles of iteration. A first step involves measuring power received at the sensors; as already discussed, received power may be measured at a middle sensor 4, edge sensor 6 and outside sensor 8, (step S10.1). A message is sent from each sensor to the radio network controller indicating the received power and identifying the sensor. On receipt of each message, the radio network controller calculates a contribution to an objective function on the basis of a contribution function that is dependent on the location of the sensor (step S10.2); the location may be classified into Middle, Edge or Outside categories, for example. Other categories of location may be used, and indeed the coordinates of the sensor could be used to weight the contribution to the objective function as a continuous function. For example, the contribution of an outside sensor may be weighted according to the distance between the location of the sensor and the edge of the designated area of coverage. It should be noted that as an alternative, the contribution to the objective function may be calculated at each sensor and the message sent to the radio network controller then conveys the calculated contribution; that is to say, step S10.1 is carried at the sensors.

The calculated contributions may then be combined to evaluate an objective function (step S10.3). A simple method of combination involves adding each calculated contribution. Alternatively, calculated contributions may be weighted according to a predetermined factor and then added together. Such predetermined factors may reflect, for example, the relative importance of receiving a good signal at a M sensor. The objective function and the functions determining the contributions to the objective function by sensors are typically predetermined by a network operator or network designer. Typically, a default objective function may be provided by an equipment vendor.

Transmission parameters may then be optimised on the basis of the calculated value of the objective function (step 10.4). According to a typical perturbation algorithm, a transmission parameter, such as transmit power, will be perturbed up, that is to say increased by a small amount, typically less than 3 dB, and the objective function will be calculated on the basis of received power measurements at the sensors. The transmission parameter is then sent to the access point 2, for example as message TXP indicating transmit power (step S10.5). The transmission power of the access point is set in response to the message (step 10.6). The transmission parameter will then be perturbed down, that is to say decreased by a small amount, and the objective function will again be calculated on the basis of received power measurements at the sensors. The transmission parameter will then be updated in the direction that produced the lower value of the objective function. It can thus be seen that the objective function will be minimised by a number of iterations through the process illustrated in FIG. 10.

Figure 11:
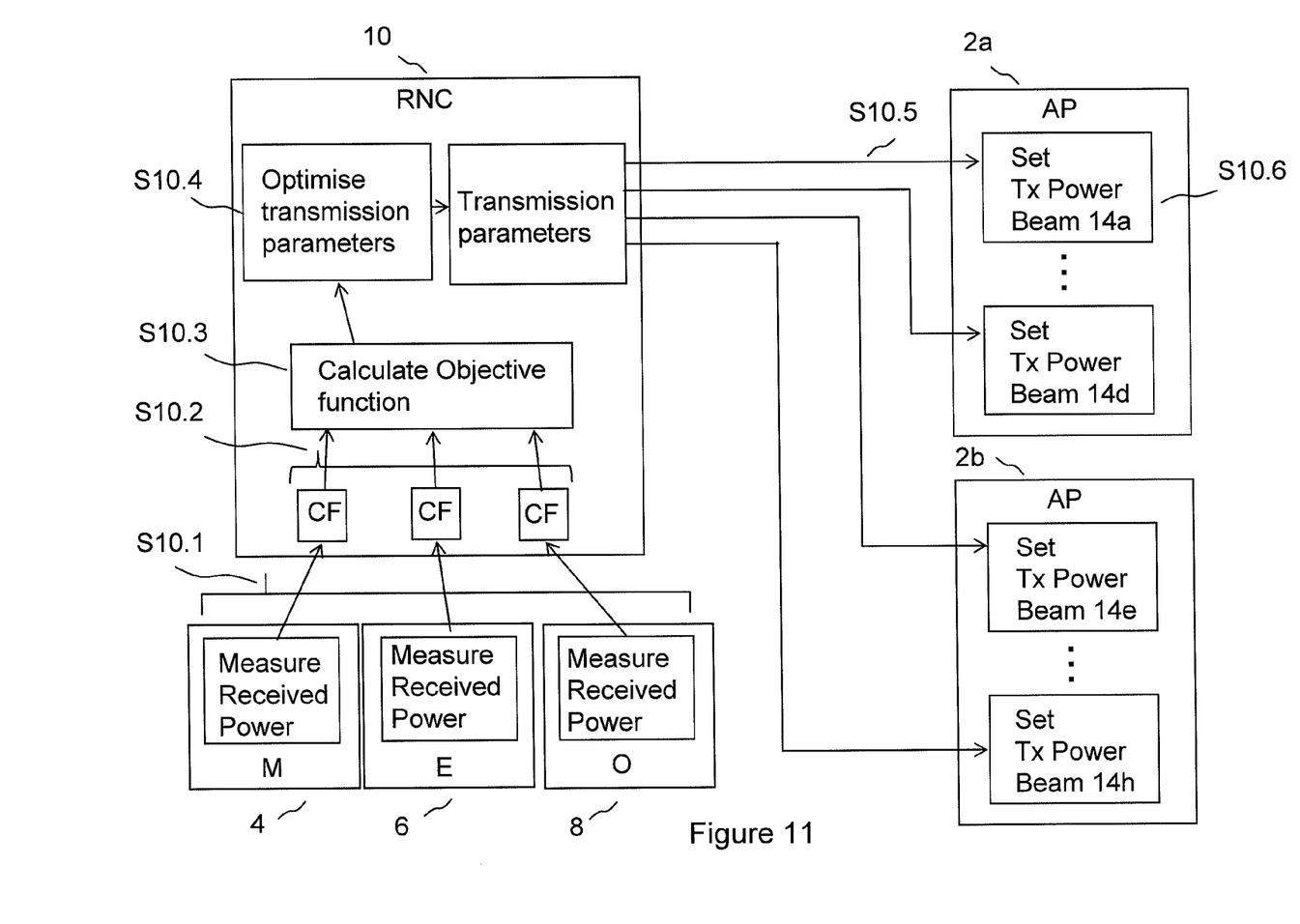
FIG. 11 is a diagram showing a typical logical flow of messages in a system with two access points, each with four beams, implemented as an embodiment of the invention.

FIG. 11 shows typical signalling in a further embodiment of the invention, in which the transmission parameters of two access points 2a, 2b are controlled by a radio network controller 10 in dependence on outputs from sensors 4,6,8. In this example, each access point has 4 beams 14a ... 14d and 14e ... 14h, and the transmission parameters represent the transmit power of respective beams. Typical operation is similar to that of the system shown in FIG. 10, and performed iteratively; however in this case further iterations are required as the power of each beam in turn is perturbed. The transmission parameters may alternatively be perturbed and the objective function may be optimised by the well-known Nelder-Mead Downhill Simplex algorithm, that may typically achieve a minimisation of the objective function using fewer steps than the simple up/down perturbation algorithm described above.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of optimising radio frequency field strength in a radio communications network, the network comprising a wireless access point arranged to transmit a signal at a configurable power level, the radio frequency field strength being dependent on the transmitted signal power level, and the network further comprising a plurality of sensors, each sensor having a defined location with respect to a designated zone of wireless coverage, the method comprising:

receiving at each sensor the signal transmitted from the wireless access point;

measuring the power of said received signal at each sensor, the received signal power being dependent on the radio frequency field strength at the location of the sensor; and controlling transmitted power from the wireless access point in dependence on a difference between said power measured at each sensor and an expected level of power at each sensor, said expected level of power at each sensor being a function of the location of each sensor with respect to said designated zone of wireless coverage;

controlling the transmitted power from the wireless access point in dependence on minimizing an objective function, in which the objective function comprises contributions from two or more sensors selected from a group comprising:

a first sensor at the edge of the designated zone of coverage, the contribution of the first sensor having a characteristic that that increases with increasing as deviation from a target received signal power;

a second sensor, the second sensor being within the designated zone of coverage, the contribution of the second sensor having a characteristic that decreases with increasing received signal power up to the target received signal power and that is substantially constant when the signal power is above the target signal power; and a third sensor, the third sensor being outside the designated zone of coverage, the contribution of the third sensor having a characteristic that increases with increasing received signal power above to a threshold of received signal power and that is substantially constant when the signal power is below the threshold, the threshold being lower than the target received power, in which at least one of said sensors is located at the edge of or outside the designated zone of wireless coverage.

2. The method according to claim 1, further comprising:
controlling a radiation pattern of the signal transmitted from the wireless access point dependent on said measurement at each sensor and dependent on the location of each sensor in relation to a designated zone of coverage, the control being on the basis of the difference between the measured power and a expected level of power at each sensor.

3. The method according to claim 2, including applying element weighting values to elements of an antenna array, whereby to control said radiation pattern.

4. The method according to claim 2, in which the access point comprises an antenna arrangement forming a plurality of beams, the method comprising applying a plurality of gain characteristics to a plurality of antenna beams.

5. The method according to claim 4, in which the antenna arrangement comprises a plurality of antenna elements, each arranged to generate a beam that is spatially adjacent to a beam generated by another said antenna element, the method comprising arranging for each said antenna element to radiate with a mutually orthogonal state of polarisation with respect to an antenna element generating a spatially adjacent beam.

6. The method according to claim 5 comprising controlling the radiation pattern of the antenna arrangement by splitting transmit power unequally between antenna beams.

7. The method according to claim 1, comprising
measuring the signal to interference ratio of said received signal at each sensor,
in which said transmitted power is controlled in dependence on said measurement of the signal to interference ratio of said received signal at each sensor.

8. The method according to claim 1, in which the network comprises a plurality of wireless access points, the method further comprising:
receiving at each sensor a plurality of signals, each signal transmitted from one of the plurality of wireless access points;
selecting a wireless access point as a best server for each sensor; and
measuring the power of the signal received from the best server at each sensor,
in which said transmitted power is controlled in dependence on said measurement of the signal received from the best server at each sensor.

9. The method according to claim 8, comprising:
controlling said radiated power from the best server in dependence on the traffic loading of the access point,
in which said transmitted power is controlled according to an algorithm that increases the transmitted power from an access point if the loading increases.

10. The method according to claim 1, in which the network comprises a plurality of wireless access points, the method further comprising:
receiving at each sensor a plurality of signals, each signal transmitted from one of the plurality of wireless access points; and
measuring the total power of the received signals at each sensor,
in which said transmitted power is controlled in dependence on said measurement of the total power of the received signals at each sensor.

11. The method according to claim 1, comprising
controlling the transmitted power from the wireless access point, said controlling being dependent on minimising an objective function,
in which the objective function comprises a contribution from a sensor at the edge of a designated zone of coverage, the contribution having a characteristic that increases with increasing as deviation from a target received signal power.

12. The method according to claim 1,
in which the transmitted power is controlled in dependence on minimising the objective function, in dependence on a determined dependence of the objective function on the radiated power of the access point.

13. A radio communications network comprising a wireless access point transmitting a signal and a plurality of sensors, each sensor having a defined location with respect to a designated zone of wireless coverage, the network further comprising:
a receiver at each sensor for receiving the signal transmitted from the wireless access point;
a detector at each sensor for measuring the power of said received signal, the received signal power being dependent on the radio frequency field strength at the location of the sensor; and
a radio network controller for controlling transmitted power from the wireless access point in dependence on a difference between said power measured at each sensor and an expected level of power at each sensor, said expected level of power at each sensor being a function of the location of each sensor with respect to a designated zone of coverage, wherein the radio network controller further controls the transmitted power from the wireless access point in dependence on minimizing an objective function, in which the objective function comprises contributions from two or more sensors selected from a group comprising:
- a first sensor at the edge of the designated zone of coverage, the contribution of the first sensor having a characteristic that that increases with increasing as deviation from a target received signal power.
- a second sensor, the second sensor being within the designated zone of coverage, the contribution of the second sensor having a characteristic that decreases with increasing received signal power up to the target received signal power and that is substantially constant when the signal power is above the target signal power; and
- a third sensor, the third sensor being outside the designated zone of coverage, the contribution of the third sensor having a characteristic that increases with increasing received signal power above to a threshold of received signal power and that is substantially constant when the signal power is below the threshold, the threshold being lower than the target received power, wherein at least one of said sensors is located at the edge of or outside the designated zone of wireless coverage, whereby to optimise radio frequency field strength.

14. A radio communications network according to claim 13, wherein said antenna arrangement comprises
- a plurality of antenna elements capable of forming a plurality of beams; and
- a controllable feed network capable of setting the gain of each antenna beam, wherein spatially adjacent beams are equipped to radiate with mutually orthogonal polarisation.

15. A radio communications network according to claim 14, wherein said controllable feed network comprises a power splitter capable of splitting transmit power unequally between antenna beams that are orientated within opposite quadrants of an azimuth radiation pattern.

16. A radio communications network according to claim 15, wherein said power splitter comprises a first 3 dB hybrid network, a controllable phase shifter and a second 3 dB hybrid network, wherein one of the input ports of the first 3 dB hybrid network is connected to a source of transmit power, one output port of the first 3 dB hybrid network is connected via the controllable phase shifter to an input port of the second 3 dB hybrid network, the other output port of the first 3 dB hybrid network is connected to the other input port of the second 3 dB hybrid network, and the two output ports of the second 3 dB hybrid network are each connected to respective antenna elements, each antenna element forming a beam and the beams being orientated within different quadrants of an azimuth radiation pattern.

* * * * *

UNITED STATES PATENT AND TRADEMARK OFFICE
CERTIFICATE OF CORRECTION

| | | |
|---|---|---|
| PATENT NO. | : 8,125,917 B2 | Page 1 of 1 |
| APPLICATION NO. | : 12/249077 | |
| DATED | : February 28, 2012 | |
| INVENTOR(S) | : Bevan et al. | |

It is certified that error appears in the above-identified patent and that said Letters Patent is hereby corrected as shown below:

Column 11, line 21, "that that" should read - that -.

Column 13, line 6, "that that" should read - that -.

Signed and Sealed this
Twenty-ninth Day of May, 2012

David J. Kappos
*Director of the United States Patent and Trademark Office*